US011954306B2

(12) United States Patent
Scott et al.

(10) Patent No.: US 11,954,306 B2
(45) Date of Patent: *Apr. 9, 2024

(54) SYSTEM FOR UNIVERSAL REMOTE MEDIA CONTROL IN A MULTI-USER, MULTI-PLATFORM, MULTI-DEVICE ENVIRONMENT

(71) Applicant: Google LLC, Mountain View, CA (US)

(72) Inventors: Mark David Scott, Kirkland, WA (US); Mark Alan Foltz, Seattle, WA (US); John Affaki, San Jose, CA (US); Majd Bakar, San Jose, CA (US); Francis Tsui, Mountain View, CA (US); Jennifer Shien-Ming Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,411

(22) Filed: Mar. 18, 2021

(65) Prior Publication Data

US 2021/0208756 A1    Jul. 8, 2021

Related U.S. Application Data

(63) Continuation of application No. 16/798,991, filed on Feb. 24, 2020, now Pat. No. 10,956,002, which is a
(Continued)

(51) Int. Cl.
*G06F 3/0484* (2022.01)
*H04N 21/41* (2011.01)
*H04N 21/422* (2011.01)

(52) U.S. Cl.
CPC ....... *G06F 3/0484* (2013.01); *H04N 21/4112* (2020.08); *H04N 21/41265* (2020.08); *H04N 21/42209* (2013.01)

(58) Field of Classification Search
CPC .............. G06F 3/0484; H04N 21/4112; H04N 21/41265; H04N 21/42209
See application file for complete search history.

(56) References Cited

U.S. PATENT DOCUMENTS 6,545,587 B1    4/2003    Hatakeyama et al.
8,054,294 B2    11/2011    Sakai et al.
(Continued)

FOREIGN PATENT DOCUMENTS

CN    1481117    3/2004
CN    101019090    8/2007
(Continued)

OTHER PUBLICATIONS

Decision to Refuse a European Patent Application dated May 16, 2019 in EP Patent Application No. 14731444.7.
(Continued)

*Primary Examiner* — Phenuel S Salomon
(74) *Attorney, Agent, or Firm* — Kilpatrick Townsend & Stockton LLP

(57) ABSTRACT

A system enables universal remote media control across multiple platforms, devices, and users. A protocol allows a cast controller to have access to media operations and a state(s) associated with media content. The system receives commands from a cast controller, provides the commands to a media player, loads new media content into the media player, based on the commands, and receives state notifications from the media player. Another cast controller can receive the state notifications from the media player and control the media player based on the media operations and state(s) associated with media content.

15 Claims, 8 Drawing Sheets

Related U.S. Application Data continuation of application No. 16/041,022, filed on Jul. 20, 2018, now Pat. No. 10,572,117, which is a continuation of application No. 14/272,300, filed on May 7, 2014, now Pat. No. 10,031,647.

(60) Provisional application No. 61/823,016, filed on May 14, 2013.

(56) References Cited

U.S. PATENT DOCUMENTS

| | | | |
|---|---|---|---|
| 9,264,753 B2* | 2/2016 | Xu | H04N 21/42224 |
| 9,544,388 B1* | 1/2017 | Li | H04L 67/125 |
| 9,665,629 B2 | 5/2017 | De Kindiq | |
| 9,762,704 B2* | 9/2017 | Deng | H04L 65/612 |
| 9,832,251 B2* | 11/2017 | Ljung | H04L 65/80 |
| 10,031,647 B2 | 7/2018 | Scott et al. | |
| 2003/0234737 A1 | 12/2003 | Nelson et al. | |
| 2005/0013589 A1* | 1/2005 | Shah | G11B 20/00246 386/290 |
| 2005/0183120 A1 | 8/2005 | Jain et al. | |
| 2007/0201705 A1* | 8/2007 | Dorogusker | H04R 5/04 381/104 |
| 2007/0294369 A1 | 12/2007 | Ginter et al. | |
| 2008/0034095 A1 | 2/2008 | Richardson et al. | |
| 2008/0222520 A1 | 9/2008 | Balakrishnan et al. | |
| 2009/0021651 A1 | 1/2009 | Pratt et al. | |
| 2009/0040970 A1 | 2/2009 | Ahmadi et al. | |
| 2009/0228897 A1* | 9/2009 | Murray | G06F 9/544 719/313 |
| 2010/0091835 A1 | 4/2010 | Morris | |
| 2010/0293598 A1* | 11/2010 | Collart | H04N 21/4325 709/227 |
| 2010/0333135 A1 | 12/2010 | Lau et al. | |
| 2011/0074545 A1* | 3/2011 | Yamada | H04N 21/42204 340/6.1 |
| 2011/0169750 A1 | 7/2011 | Pivonka et al. | |
| 2011/0304443 A1 | 12/2011 | Sheridan et al. | |
| 2012/0019400 A1 | 1/2012 | Patel et al. | |
| 2012/0050310 A1 | 3/2012 | Patel et al. | |
| 2012/0070017 A1* | 3/2012 | Dorogusker | H04S 7/00 381/104 |
| 2012/0117262 A1* | 5/2012 | Deng | H04L 69/18 709/231 |
| 2012/0178371 A1 | 7/2012 | Patel et al. | |
| 2012/0272147 A1 | 10/2012 | Strober | |
| 2013/0117352 A1 | 5/2013 | Chen et al. | |
| 2013/0167028 A1 | 6/2013 | Goldman et al. | |
| 2014/0037107 A1* | 2/2014 | Marino, Jr. | H03G 3/3005 381/107 |
| 2014/0109134 A1* | 4/2014 | Gauthier | G06Q 30/00 725/34 |
| 2014/0178028 A1* | 6/2014 | Park | H04L 65/1093 386/201 |
| 2014/0344689 A1 | 11/2014 | Scott et al. | |
| 2018/0373491 A1* | 12/2018 | Millington | G06F 1/00 |

FOREIGN PATENT DOCUMENTS

| | | |
|---|---|---|
| CN | 102236340 | 11/2011 |
| CN | 102473342 | 5/2012 |
| CN | 103577163 | 2/2014 |
| EP | 2302909 | 3/2011 |
| WO | WO 2009113932 | 9/2009 |
| WO | WO 2011008387 | 1/2011 |
| WO | WO 2014186206 | 11/2014 |

OTHER PUBLICATIONS

Examination Report dated Jan. 26, 2018 in EP Patent Application No. 14731444.7.
International Search Report and Written Opinion dated Sep. 24, 2014 in International Patent Appliction No. PCT/US2014/037282.
Notice of Allowance dated Mar. 27, 2018 in U.S. Appl. No. 14/272,300.
Notice of Allowance dated Apr. 13, 2020 in KR Patent Application No. 10-2015-7035002.
Notice of Allowance dated Oct. 3, 2019 in U.S. Appl. No. 16/041,022.
Notice of Allowance dated Nov. 16, 2020 in U.S. Appl. No. 16/798,991.
Office Action dated Feb. 9, 2018 in CN Patent Application No. 201480027596.2.
Office Action dated Mar. 9, 2017 in U.S. Appl. No. 14/272,300.
Office Action dated Apr. 8, 2016 in U.S. Appl. No. 14/272,300.
Office Action dated Jun. 27, 2019 in U.S. Appl. No. 16/041,022.
Office Action dated Jul. 23, 2020 in U.S. Appl. No. 16/798,991.
Office Action dated Sep. 21, 2017 in U.S. Appl. No. 14/272,300.
Office Action dated Oct. 25, 2016 in U.S. Appl. No. 14/272,300.
Office Action dated Nov. 4, 2020 in CN Patent Application No. 201811631041.5.
Summons to Attend Oral Proceedings dated Nov. 29, 2018 in EP Patent Application No. 14731444.7.

* cited by examiner

SYSTEM FOR UNIVERSAL REMOTE MEDIA CONTROL IN A MULTI-USER, MULTI-PLATFORM, MULTI-DEVICE ENVIRONMENT

CROSS-REFERENCE TO RELATED APPLICATIONS

This application is a continuation of U.S. patent application Ser. No. 16/798,991, filed Feb. 24, 2021, which is a continuation of U.S. patent application Ser. No. 16/041,022, filed Jul. 20, 2018, which is a continuation of U.S. patent application Ser. No. 14/272,300, filed May 7, 2014, which claims the benefit of U.S. Patent Application No. 61/823,016, filed May 14, 2013, each of which is incorporated by reference herein in its entirety.

TECHNICAL FIELD

This disclosure generally relates to interactions between a first device such as a media player, and a controller device, and more particularly, to remote media control in a multi-user, multi-platform, multi-device environment.

BACKGROUND

Applications may display a user interface to allow a user to control and interact with a television screen when in the vicinity. Yet, establishing pairing between the two devices uses a registration process that requires the user to explicitly grant access to the control from the device, or add hardware extensions to the device to force the pairing over certain channels, requiring a one time pairing action. These techniques often require the user to be aware of the pairing and require coupling hardware that may not be inherent to either the television or the device. Additionally, distance and different forms of interference restrict performance, and the device interface may be tied to only one television.

SUMMARY

According to one general aspect, a method for providing remote media control includes receiving at a media controller device from a media player, a set of available media operations for processing content. The method includes providing a user interface via a browser application or a mobile application on the media controller device, generating command messages from the media controller device using the user interface, the command messages based on the set of available media operations, providing the command messages to the media player, receiving state notifications from the media player, and sending additional command messages from the media controller device in response to the state notifications.

Implementations may include one or more of the following features, alone or in combination with each other. The method may include receiving the state notifications at a second media controller device, and sending new command messages for the media player from the second media controller device, wherein the command messages are input from the second media controller device using the user interface. The command messages may be defined based on a common protocol. The media player may be configured to output at least one specific type of content. The user interface may allow for a selection of the media player from a plurality of media players. The method may include receiving from the media player, content meta-data that defines how to represent the content. The user interface may allow for an input of another media player by a user. The command messages may be based on a set of operations supported by a particular type of the media player. The state notifications may include a volume status and a play status of the content. The command messages and the state notifications may include a namespace and a message payload represented as a two-element script array. The user interface may include options for controlling the content including stopping or pausing the content, increasing or decreasing volume of the content, seeking to a specific location within the content, navigating between items in a playback queue, changing audio tracks, or setting captions for the content.

In another general aspect, a method for employing remote media control includes receiving command messages from a media controller device via a service in a browser of a media player, rendering content in the media player, based on the command messages, while rendering the content, providing state notifications from the media player, and receiving additional command messages from the media controller device in response to the state notifications.

Implementations may include one or more of the following features, alone or in combination with each other. The command messages may be defined based on a common protocol. The method may include providing, via the media controller device, a user interface. The user interface may be independent of a platform-specific application installed on the media controller device. The user interface may allow for a selection of the media player from a plurality of media players. The method may include providing the user interface on a second media controller device. The method may include displaying options on the user interface for controlling the content.

Other implementations include corresponding systems, apparatus, and computer programs, configured to perform the actions of the methods, encoded on computer storage devices.

One or more of the implementations of the subject matter described herein may provide one or more of the following advantages. The system allows discovery and interactivity between any device (acting as a remote control) and a television device without the need for explicitly pairing the two devices, without platform-level or application-level required tools, and without being limited to a single-user or single device experience.

The details of one or more implementations are set forth in the accompanying drawings and the description below. Other features may be apparent from the description and drawings, and from the claims.

BRIEF DESCRIPTION OF THE DRAWINGS

Like reference symbols in the various drawings indicate like elements.

DETAILED DESCRIPTION

Increasingly, users consume their content across a number of devices, such as smartphones, tablets, PCs, consoles/STBs, TVs, etc. Yet, there is a low level of integration in a user's experience across these devices. For most users, the experiences across device boundaries are entirely distinct. Certain solutions serve only the needs of a specific application. Other content providers cannot build on those types of solutions. Moreover, certain systems are platform specific. With many households having various types of devices each operating using a different platform, platform-specific solutions only allow a subset of the household to use the system. Further, those solutions are inherently single user, such that the user who initiates an action is the only one who is permitted to interact with the activity resulting from the action in a meaningful way. If someone plays content, another person may be unable to even pause that content (short of seizing the device used to initiate the interaction). Additionally, certain systems may be platform-level or application-level, with no co-operation between levels. If playback was initiated on TV by an application, the platform can offer no control or visibility into this. If one device initiates playback in an app, and runs out of battery, a user could not just pick up another device to control playback. Instead, the user would have to hope that the correct application is installed, locate the application, and load it.

Systems and methods described here enable remote media control across multiple users, platforms, and devices.

Figure 1:
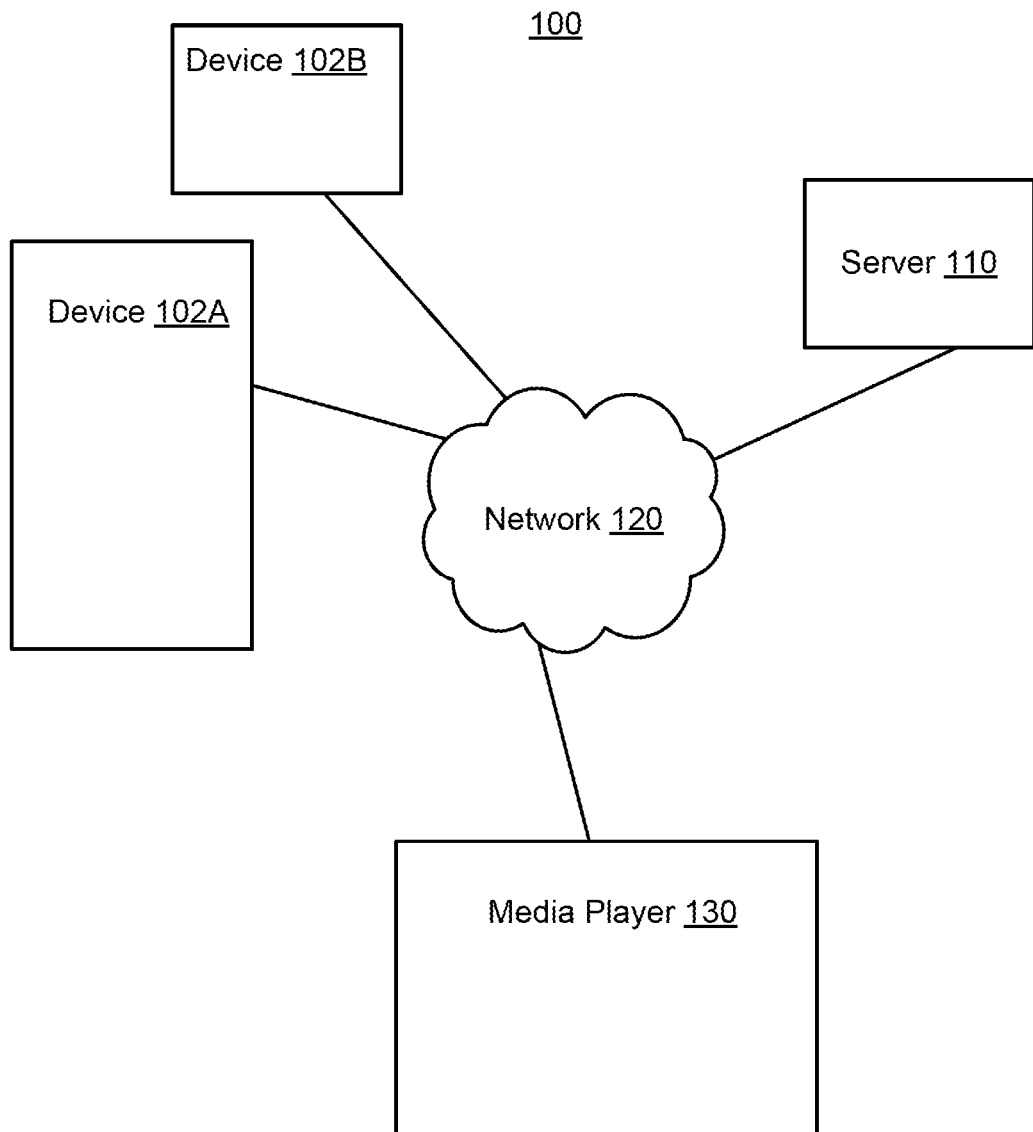
FIG. 1 is a block diagram of a system that can be used to provide remote media control.

FIG. 1 is a block diagram of a system that can be used to provide remote media control. System 100 may include a media controller device 102A, a media controller device 102B, a server 110, and a media player 130, which are interconnected through at least one network 120.

The media controller device 102A and the media controller device 102B may be a computer, a smart phone, a laptop, or a similar device that may execute a user interface, download and execute software applications, and communicate with the server 110 and the media player 130. The media controller device 102A and the media controller device 102B may include a display screen and an application such as a web browser application that may display the user interface. Various alternative and additional examples of devices that may operate as media controller devices are described in more detail below with respect to FIG. 8. Server 110 may be a remote server that operates to process commands and status messages to control a media player such as media player 130.

Network 120 may be a single network or a combination of any type of computer network, such as a Local Area Network (LAN) or a Wide Area Network (WAN), a WIFI network, a BLUETOOTH network, or other network. In addition, network 120 may be a combination of public (e.g., Internet) and private networks.

Media player 130 is a computing device with an application and a display screen. As an example, media player 130 may be a television. Media player 130 may execute software applications and may communicate with the media controller device 102A, the media controller device 102B, and the server 110. Any number of alternative or additional networks, servers, services, mobile devices, or devices may be included in system 100.

Figure 2:
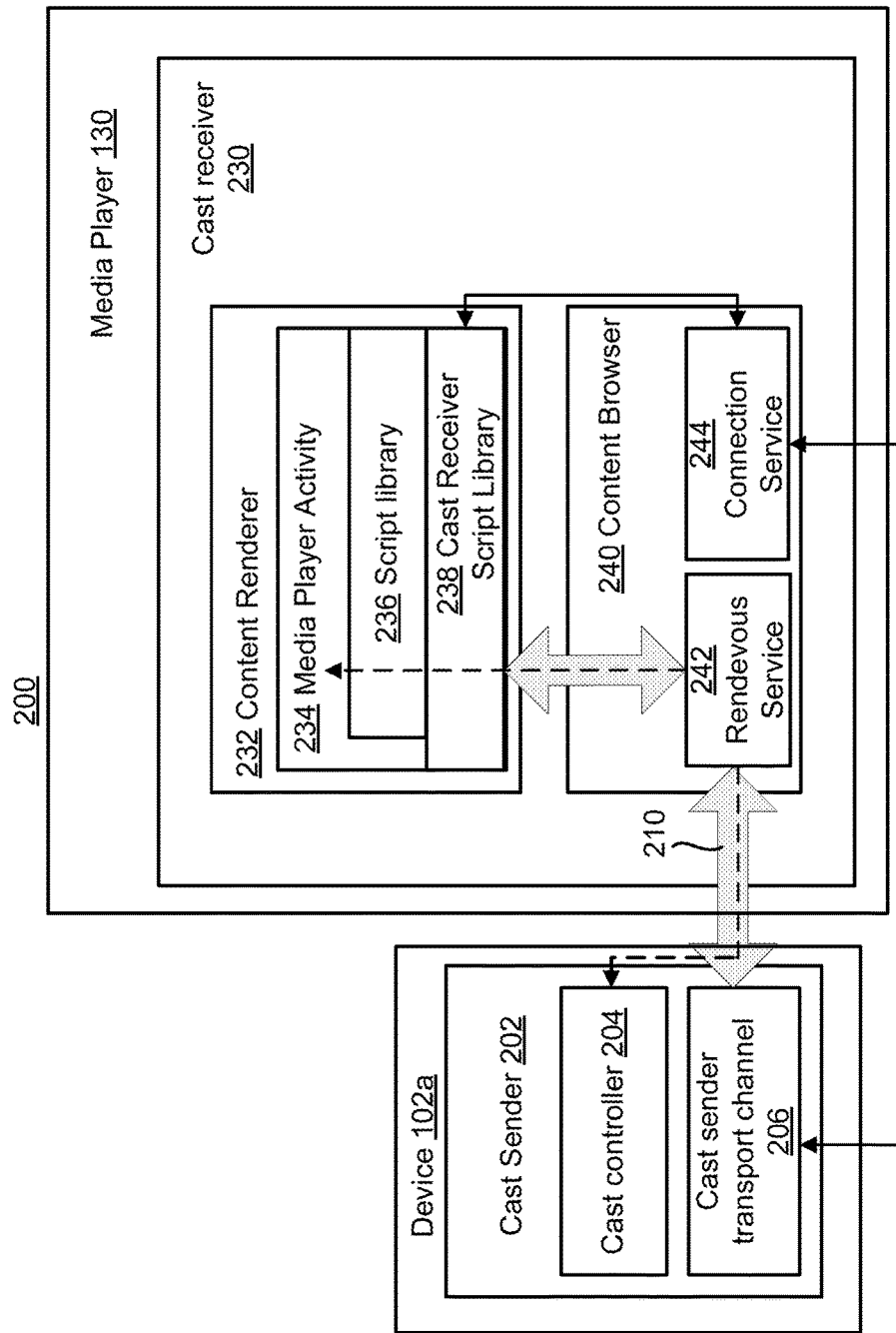
FIG. 2 is a block diagram of a system that can be used to provide remote media control.

FIG. 2 is a block diagram of a system that can be used to provide remote media control. System 200 may include the device 102a and the media player 130. The device 102a may include a cast sender 202. The media player 130 may include a cast receiver 230. The device 102a and the media player 130 are interconnected through at least one network such as the network 120 shown in FIG. 1. The device 102a's cast sender 202 may include a cast controller 204 and a cast sender transport channel 206. The media player 130's cast receiver 230 may include a content renderer 232 and a content browser 240. In some implementations, the system 200 may provide remote media control using a native application (not shown), in addition to or instead of a content browser 240. The content renderer 232 may include a media player activity 234, which may include a script library 2367, and a cast receiver script library 238. The content browser 240 may include a rendezvous service 242 and a connection service 244.

The rendezvous service 242 may establish a connection between a first application, such as a web application, running on the device 102a, and a second application running on another device such as the media player 130. The second application running on the media player 130 may send a request to load a given web application for example in the content browser 240. The web application may register itself to a connection service 244 awaiting the second application's connection request. Upon the connection request, the connection service 244 sends information to create a transport connection 210 (such as a websocket connection or a custom transport implemented over TLS/TCP) between the first application and the second application. The web application and the second application open the transport connection 210 to the rendezvous service 242, which forwards data between them, using the transport connection 210. The web application and the second application send and receive media content using a protocol, using the transport connection 210.

The cast receiver script library 238 may be a script library, such as a JAVASCRIPT library or an OAuthService library, that interacts with the connection service 244. The cast receiver script library 238 creates new websocket connections to the rendezvous service 242 using a new connection request from the connection service 244. A namespace may operate as a collection of a set of identifiers. A namespace may provide a way to avoid element name conflicts. For example, when a namespace is defined for an element, all child elements with the same prefix are associated with the same namespace. The rendezvous service 242 can route traffic based on specific namespaces for handling by the cast receiver 230 itself, not by the script library 236 or the cast receiver script library 238. The cast receiver script library 238 may also combine or separate data according to namespace. If the namespace is a specific namespace, the cast receiver script library 238 may send the data to a content-specific script library such as the script library 236.

The script library 236 may be a JAVASCRIPT library that sends and receives data packets to and from media controllers via a connection provided by the underlying cast receiver script library 238. The data packets may be in compliance with a specific protocol. The data packets may include, for example, meta-data such as content meta-data that defines how to represent content visually. The script library 236 may also perform media actions according to data packets received. The script library 236 may also receive notifications from a web application and send the notification to a media controller such as the device 102. The notifications may include, for example, notifications about the visual content such as a pop-up window to display a notice for an upcoming media program. The content renderer 232 may handle media actions and encrypted media extensions.

Figure 3:
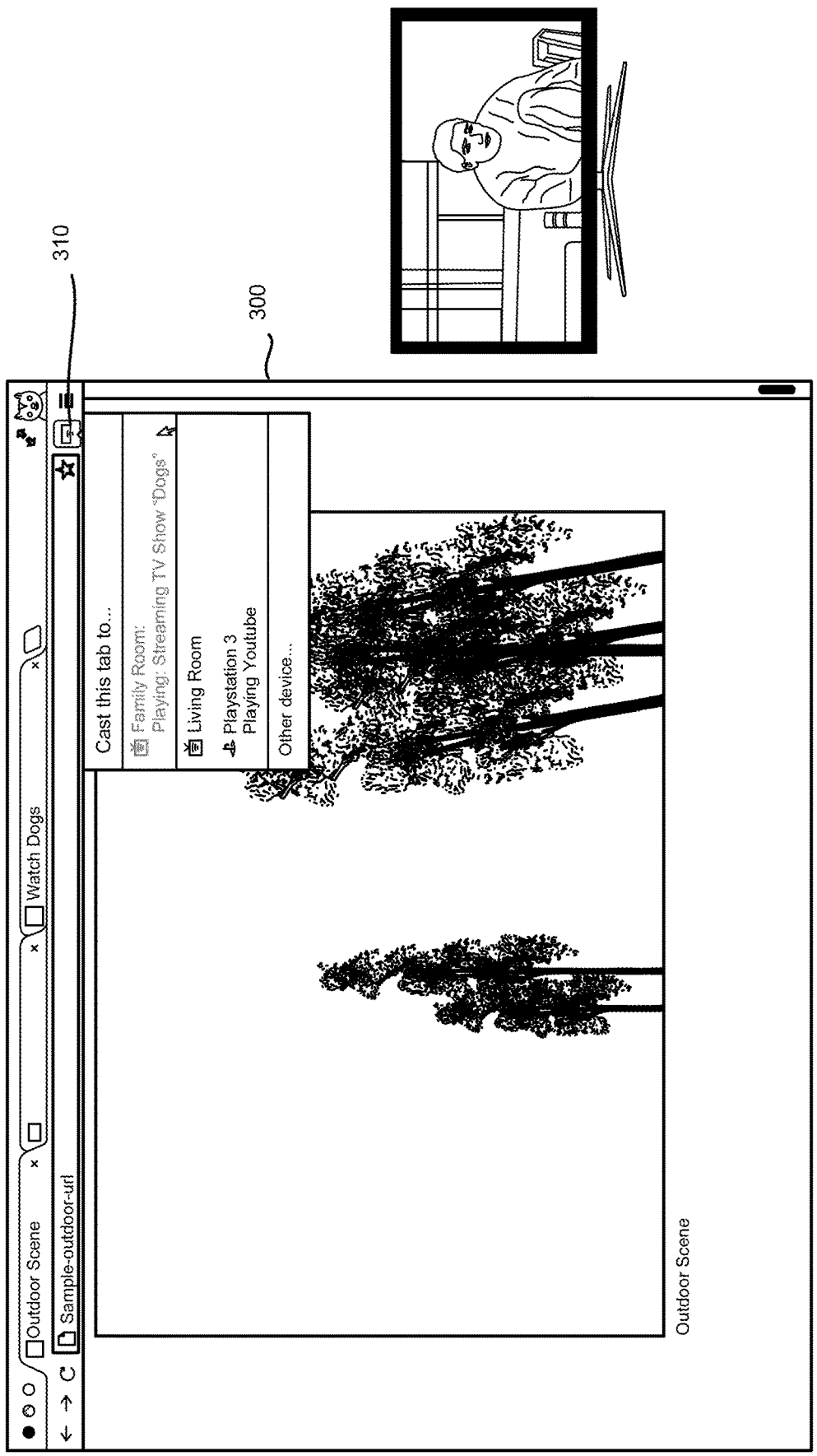
FIG. 3 is an example user interface than can be used to provide remote media control.

FIG. 3 is an example user interface than can be used to provide remote media control. As shown in FIG. 3, user interface 300 may be displayed on an application such as a web browser on a media controller device such as a computer. One example of such a media controller device is the device 102*a*, as described and shown with respect to FIG. 1 and FIG. 2. A user may select an icon 310 to cast the tab of the browser to one of a plurality of media players, such as a television, e.g., "Family Room", "Living Room" or "Other device". In some implementations, a user may select "Other device" and may enter information related to another device as another available media player that may receive content, e.g., the tab of the browser. According to various implementations, different types of media players may render different types of content. For example, a media player may be configured to render at least one specific type of content. As an example one media player may be configured to render premium content, another media player may be configured to render real-time camera-captured content, and yet another media player may be configured to render still photos. Of course, it may be understood that a single media player may also render various different types of content. A list may show each media content that is currently being rendered or provided by the other media players. For example, "Family Room" is "Playing: Streaming TV Show 'Dogs'"). Upon a selection of a graphical user interface element 320, the user may change the content of the media content being rendered at another media player, for example as discussed in more detail below with respect to FIG. 4.

Figure 4:
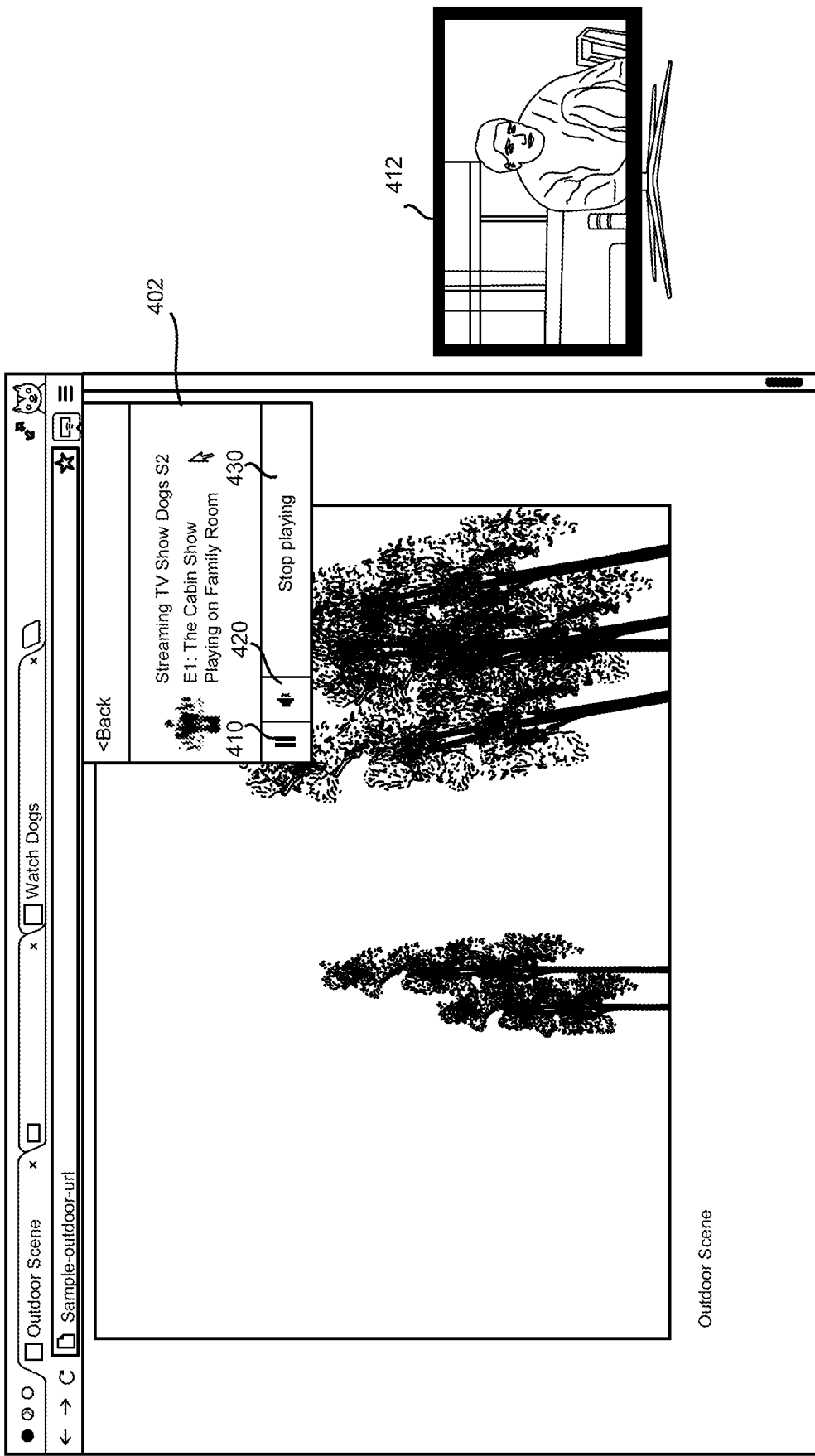
FIG. 4 is an example user interface than can be used to provide remote media control.

FIG. 4 is an example user interface than can be used to provide remote media control. A user interface dialog box 402 may include various graphical user interface elements. As shown in FIG. 4, the user may select a graphical user interface element 410 to pause a media content (e.g., Streaming TV Show 'Dogs' S2) that is being provided by a media player 412 (e.g., a television in the "Family Room"). The media player 412 may be, for example, the media player 130 shown in FIGS. 1 and 2. The user may select a graphical user interface element 420 to adjust the volume of the media content that is being provided by the media player 412. Alternatively or additionally, the user select a graphical user interface element 430 to "Stop playing" the media content on the media player 412.

Figure 5:
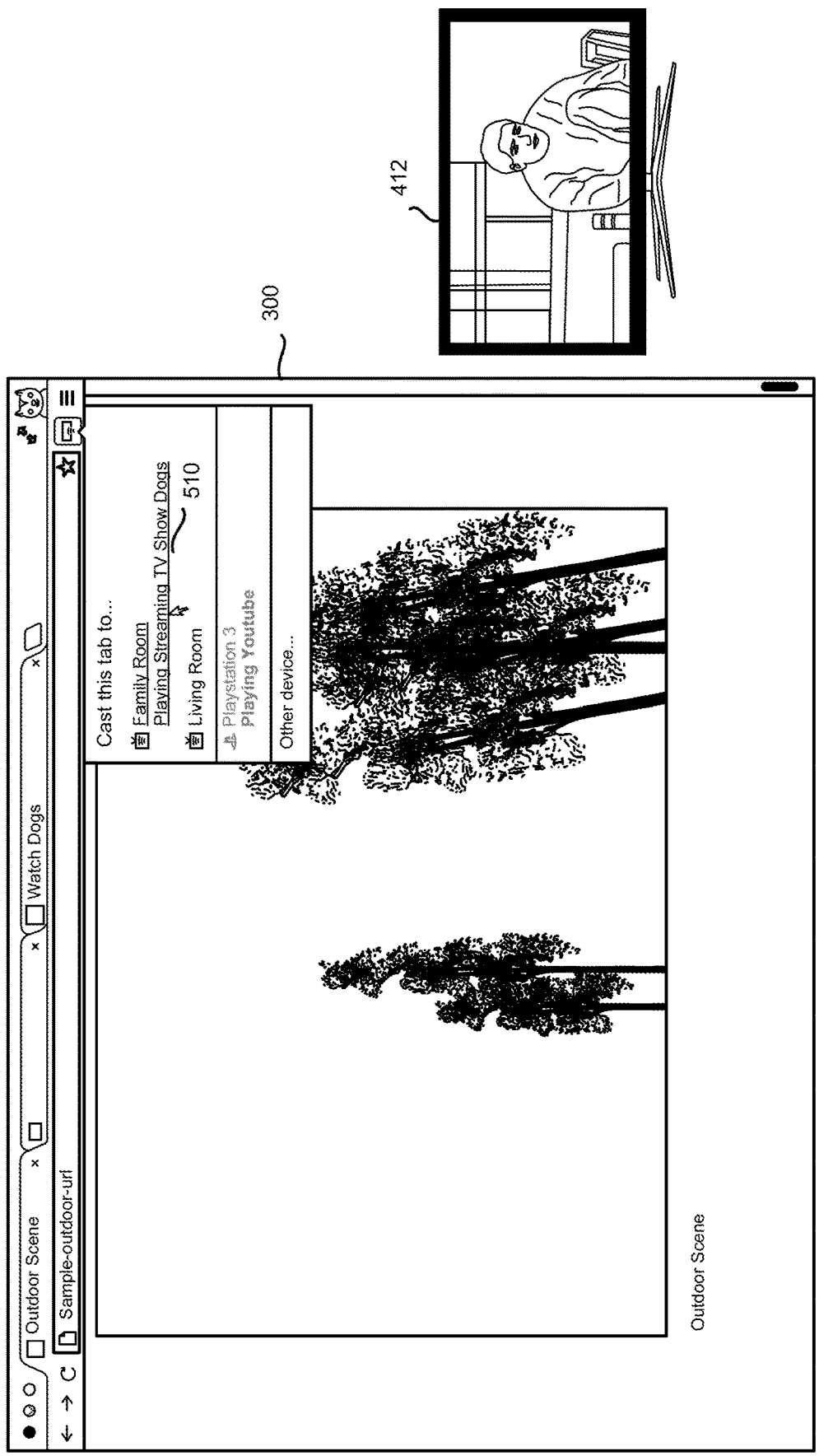
FIG. 5 is an example user interface than can be used to provide remote media control.

FIG. 5 is an example user interface than can be used to provide remote media control. The user interface 300 shown in FIG. 5 may be an example of a user interface displayed by a media controller such as the device 102*a* as shown in FIGS. 1 and 2, for example. The user interface 300 may be rendered by a web browser application or a mobile application for example. The media player 412 may be, for example, the media player 130 shown in FIGS. 1 and 2. A user may wish to cast content from the user interface 300 of the media controller to the media player 412. As shown in FIG. 5, the user may select a graphical user interface element 510 of the user interface 300 to "Cast this tab to" a media player, such as the media player 412, for example to have the "Outdoor Scene" image override the "Dogs" show on the "Family Room". Upon selection, the content shown in user interface 300 (e.g., the "Outdoor Scene" image) may be rendered in the media player.

Figure 6:
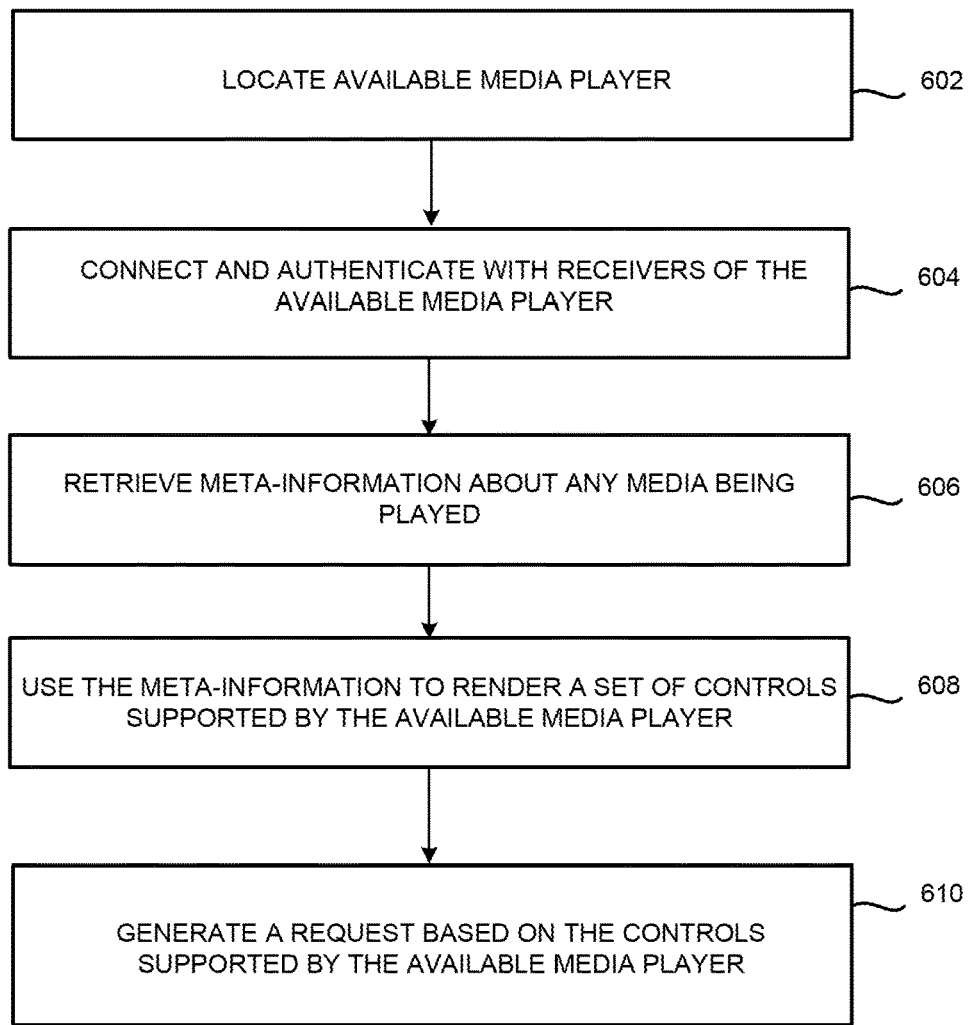
FIG. 6 is flow diagram of a process that can be used to implement remote media control.

FIG. 6 is a flow diagram of a process that can be used to implement remote media control. The process illustrated in FIG. 6 may be performed at least in part by a computing system, for example, the cast sender 202 shown in FIG. 2, which may be a universal remote, for example. A user interface may be rendered dynamically based on meta-information supplied by content currently being played by a media player. The user interface may include information about the content, such as a title, length of a show, or source of the content such as a website or streaming service. The user interface may also include a list or set of one or more available media operations, such as load, play, pause, stop, fast-forward, slow, delete, or other controls, which a user may apply to the content. Different media players may have different available media operations that are specific to the media player or the type of media player. Therefore, command messages from a media controller device may also depend on a set of operations available for a particular type of media player. For example, a media player that is customized to display still photos may have different available media operations from a media player that is customized for a television show, and each may have different available media operations from a media player that is customized for playing audio files. Certain types of media players may not support seeking or pausing content, for example.

As shown in FIG. 6, a system may locate one or more available media players (602), such as the media player 130 shown in FIGS. 1 and 2. The system may then connect and authenticate with receivers of the available media player(s) (604). The system may retrieve meta-information about any media being played (currently) by the available media player (606). For example, the system may retrieve meta-information such as a program being played on the available media player, position of the program, or other meta-information such as content meta-data that defines how to represent the content visually. The system may use the meta-information to render a set of controls or operations supported by the available media player (608). For example, not all media may support seeking or even pausing. In such a case, the example set of controls could include play and stop. The system may generate one or more requests based on the controls supported by the available media player (610), for example after receiving a user selection of one of the controls on the user interface. The request(s) may be interpreted by application-specific code to generate a response based on programmed code. The application-specific code may format the response in a generic command language specified by the cast sender 202.

Figure 7:
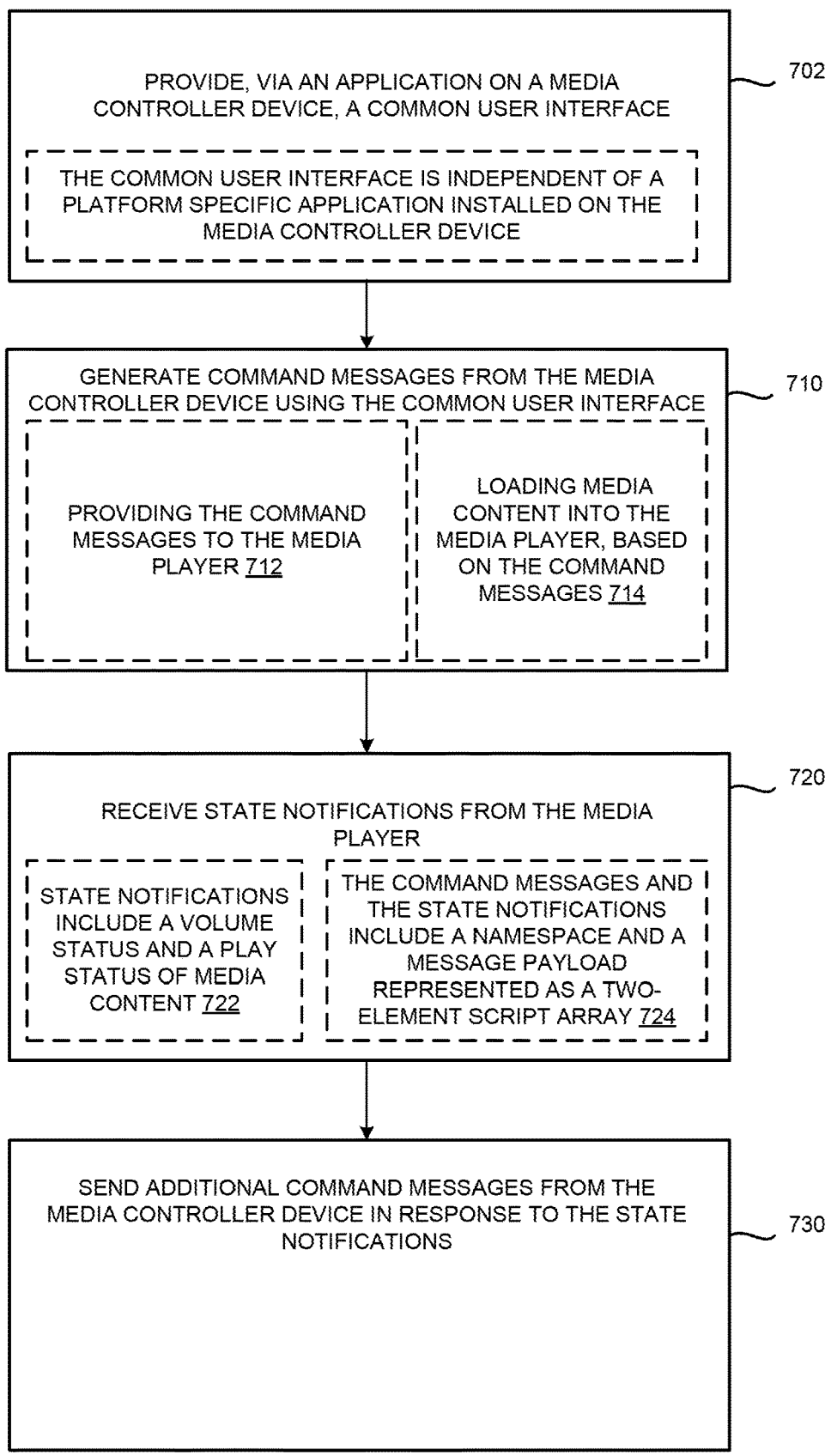
FIG. 7 is flow diagram of a process that can be used to provide remote media control.

FIG. 7 is flow diagram of a process that can be used to provide remote media control. The process illustrated in FIG. 7 may be performed at least in part by a computing system, for example, the cast sender 202 shown in FIG. 2. As shown in FIG. 7, a device such as a media controller device (e.g., the cast sender 202) may provide, via an application on the media controller device, a common user interface (702). Examples of a common user interface are described above with respect to FIGS. 3-5. As one example, the common user interface may be the user interface 300 shown in FIG. 3. As another example, the common user interface may be the interface dialog box 402 shown in FIG. 4. The common user interface may be independent of a platform-specific application. Examples of platform-specific applications include a specific name brand of a web browser, or a specific name brand of native application or a mobile application, such as a native application that only works on a specific operating system or platform installed on the media controller device. As an example, the common user interface may operate via various types of web browsers, or on various operating systems or platforms executed by various types of computing devices including mobile devices. Thus, the system may provide for multiple users, multiple platforms, and multiple devices to control remote media content via the common user interface.

The media controller device may generate command messages using the common user interface (710). The process may include providing the command messages to a media player (712). In some implementations, the process may include loading media content into the media player based on the command messages (714).

The command messages are sent from the medial controller device to the media player. In some implementations, the command messages are in a JSON format. The messages generate responses from the media player, in some implementations, and responses are correlated to commands via the use of a cmd_id field. This id space may be managed by the media controller device. The media controller device may determine whether there are any duplicate outstanding cmd_id. If a command generates no responses, the cmd_id field may be set to 0.

The media controller device may receive state notifications from the media player (720). The state notifications are time-sensitive information related to the media content or related to meta-data associated with the content. The state notifications may, for example, include a current media status or media position, such as a volume status and a play status of the media content (722). In some implementations, the command messages and the state notifications include a namespace and a message payload represented as a two-element script array (724). The payload may be the actual data included in the message. When the actual data is represented as a two-element script array, it may be ordered in a particular arrangement, such as "[namespace], [message payload]." Other arrangements of the data are possible and additional data may also be included in various implementations. The media controller device may send additional command messages in response to the state notifications (730).

In some implementation media time synchronization between the media player and the media controller device may be achieved by the use of a STATUS message. When a controller receives a STATUS message with a valid current field, it adjusts the media time to match what is reported by the message. If a time_progress field in the message has the value of true, the local media time can be extrapolated using a time source on the media controller device.

Examples of command messages include casting media content (e.g., a movie) to a different available media player (e.g., a media play which may be in another room in a house), stopping or pausing the media content playing on a computer, increasing or decreasing volume of the media content, seeking to a specific location within the media, navigating between items in a playback queue, changing audio tracks, setting captions, etc. Examples of state notifications include a current media status or media position.

In some implementations, the process may include receiving the state notifications at a second media controller device, and sending new command messages for the media player from the second media controller device, wherein the command messages are input from the second media controller device using the common user interface.

In some implementations, the command messages use a common protocol. In some implementations, the common user interface allows for a selection of the media player from a plurality of media players. In some implementations, for example as shown above with respect to FIGS. 4-6, the common user interface provides for a selection of the media content (e.g., which tv show, video, etc. to cast). In some implementations, the application provides the common user interface is a browser application. The common user interface may include options for controlling the media content (e.g., pausing, fast forwarding, changing, stopping, rewinding, etc.), for example as discussed above with respect to FIGS. 4-6.

In some implementations, media tracks in the current content are described using the following data structure. The data structure may include content meta-data that defines how to represent the content visually, as shown below, such as an "id", "selected" "type" or other meta-data. The example discussed below may be implemented at least in part by, for example, the system of FIG. 1.

```
TRACKS: [
  {
    "id": <int>, // unique identifier of track
    "type": "subtitles"|"captions"|"audio"|"video",
    "name": <string>, // optional, human readable descrip-
       tion
    "lang": <ISO--639 lang code?>, // optional
    "selected": <boolean>// optional, true if track is in use,
       default false
  }, { ... }]
}
```

An ID is unique within the scope of a single content. An ID does not change during the lifetime of a playback session.

Type: identifies the type of track. Supported types include subtitles, closed captions, audio, and video. If content contains only 1 track or types video and audio, i.e. if there are no user selections possible, then these tracks may not be returned.

Name: Human readable description of the track. This may be, for example, a description of an audio track or an alternate audio track. The name field may be the language specified in a lang field (the language of the track given in ISO-629 code).

Selected: indicates if the track is currently being used for playback by a media player device such as the media player 130 shown in FIG. 1. This field may be modified by the SELECT_TRACKS command.

Player status is represented by the following JSON object which is used by various other messages:

```
{
  "event sequence": <int ID>,
  "state": <Player State>,
  "content_id": "<Content Identifier>", // src in LOAD
  "title": <string>, // optional, descriptive title of content
  "time_progress": <boolean>, // indicate if media time is
     progressing
  "current_time": <double>, // sec since beginning of
     content
  "duration": <double>, // sec for duration of content
  "volume": <double>, // 0.0--1.0
  "muted": <boolean>, // mute state, set by VOLUME
     command
  "content_info": { ... }, // optional
  "tracks": <TRACKS>, // optional array of tracks
  "error":
  {
    "domain": <string>, // Error domain
    "code": <int>// Error code
  }
}
```

The sequence number is used to identity the relative position of status events received from response to a set of available operations (LOAD, PLAY, etc.), and those received from unsolicited status updates. When a status event is received from the response of an operation, any status event received with sequence number less than that of the response can be ignored.

state:
0=IDLE
1=STOPPED
2=PLAYING

If player state is IDLE, then all fields except sequence and error can be ignored.

content_id: This is a service-specific identifier of content currently loaded by the media player, such as the media player 130 shown in FIG. 1. The content_id may be a free form string and is specific to an application operating on the media player 130.

title: A descriptive title of the content. A media player, such as the media player 130 shown in FIG. 1, can independently retrieve a title using content_id or it can be given by the media controller device in a LOAD message.

time_progress: Indicates whether the media time is progressing. If the value is false, the media controller device, such as the media controller device 102A, may stop extrapolating the media time. This is independent of the media player 130 state because the media time can stop in any state.

current_time: The current position of the media player 130 since the beginning of the content, in seconds. If this a live stream content, identified with null duration, then this field represent the time in seconds from the beginning of the event that can be known to the media player 130.

duration: This field represent the duration of the currently playing stream in seconds. If the stream is a live stream then this field is null.

volume: This field indicates the current volume level as a value between 0.0 and 1.0.

content_info: This field contains a service specific object which can be used to provide more in depth information about the content currently controlled by the media controller device 102A. The initial value of the field can be provided by the media controller device 102A in a LOAD message. Media players, such as the media player 130 shown in FIG. 1, are free to modify the content of the object to provide information obtained from logic of the media player 130.

error: The error object returns the last error encountered by the media player 130 since the last control operation. If no error has been encountered, it can be set to null.

Error Domain: Error domain to segregate errors, so that applications can return their own errors.

Error Code: error code specific to the domain

STATUS: This command requests the status of the content currently playing in the media player 130.

Request:
{
    "cmd_id": <int ID>,
    "type": "INFO",
}
Response:
{
    "cmd_id": <int ID>,
    "type": "RESPONSE",
    "status": <player status object>, // See Player Status
}

LOAD: This command is used to load new content into the media player 130.

The <content_id> field contains an identity of the content that needs to be loaded into the media player 130. The format of this field is defined by the application and the media player 130.

Request:
{
    "cmd_id": <int ID>,
    "type": "LOAD",
    "src": "<content_id>", // optional
    "title": <string>, // optional
    "autoplay": true|false, // optional, default false
    "content_info: {_}// optional
}
Response:
{
    "cmd_id": <int ID>,
    "type": "RESPONSE",
    "status": <player status object>, // See Player Status
}

If the autoplay parameter is specified, the media player 130 may begin playing the content when it is loaded. Even if autoplay is not specified, the media player 130 implementation may choose to begin playback immediately. If playback is started, the player state in the response can be set to PLAYING, otherwise it can be set to STOPPED.

The title field optionally provides a user readable descriptive string for the content being loaded. If provided, the string may be used by the media player 130 as initial value for the title field of each STATUS object sent from the media player 130. Whether or not the title is provided in the LOAD message, the media player 130 can modify the title at any point based on logic of the media player 130.

The content_info field can contain a JSON object which give more in depth information about the content being loaded, e.g. id of a TV service, episode number etc. If provided, the content_info object may be used as the initial value of the content_info field of each STATUS message. The media player 130 is free to modify the content_info at any point.

PLAY: This begins playback of the content that was loaded with the load call or change the playback position of a currently loaded content. If the position field is not specified, then playback is continued from the current position. If position provided is outside the range of valid position of the current content, then the media player 130 may pick a valid position as closed to the requested position as possible.

Request:
{
    "cmd_id": <int ID>,
    "type": "PLAY",
    "position": <double>, // optional, seconds since beginning of content
}
Response:
{
    "cmd_id": <int ID>,
    "type": "RESPONSE",
    "status": <player status object>, // See Player Status
}
STOP
{
    "cmd_id": <int ID>,
    "type": "RESPONSE",
    "status": <player status object>, // See Player Status
}

If the autoplay parameter is specified, the media player 130 may begin playing the content when the content is loaded. Even if autoplay is not specified, in various implementations, the media player 130 may begin playback immediately. If playback is started, a state of the media player 130 in the response can be set to PLAYING, otherwise it can be set to STOPPED.

The title field optionally provides a user readable descriptive string for the content being loaded. If provided, the string may be used by the media player 130 as initial value for the title field of each STATUS object sent from the media player 130. Whether or not the title is provided in the LOAD message, the media player 130 can modify the title at any point based on logic of the media player 130.

The content_info field can contain a JSON object which give more in depth information about the content being loaded, such as an ID of a TV service, episode number, or other information. If provided, the content_info object may be used as the initial value of the content_info field of each STATUS message. The media player 130 may be free to modify the content_info at any point.

PLAY: This begins playback of the content that was loaded with the load call or change the playback position of a currently loaded content. If the position field is not specified, then playback is continued from the current position. If position provided is outside the range of valid position of the current content, then the media player 130 may pick a valid position as close to the requested position as possible.

Request:
{
  "cmd_id": <int ID>,
  "type": "PLAY",
  "position": <double>, // optional, seconds since beginning of content
}
Response:
{
  "cmd_id": <int ID>,
  "type": "RESPONSE",
  "status": <player status object>, // See Player Status
}

STOP

This halts playback of the current content. There is no distinction between stopping and pausing content.

Request:
{
  "cmd_id": 0,
  "type": "STOP",
}

Stopping the content may trigger a STATUS event notification to all controllers.

VOLUME: Set the volume at the output of the device.

Request:
{
  "cmd_id": 0,
  "type": "VOLUME",
  "volume": <double>, // 0.0--1.0
  "muted": <boolean>// True to mute audio
}

Volume level can be changed even if mute is enabled. A new volume level may apply when mute is disabled.

Change in volume may trigger a STATUS event notification to all media controller devices, such as the media controller device 102A and the media controller device 102B.

SELECT_TRACKS: Selects the media tracks that the player should use.

Request:
{
  "cmd_id": <int ID>,
  "type": "SELECT_TRACKS",
  "enabled": [// optional list of tracks to enable
  <int>, <int>, . . . .
  ],
  "disabled": [II optional list of tracks to disable
  <int>, <int>, . . . }
Response:
{
  ]
  "cmd_id": <int ID>,
  "type": "RESPONSE",
  "status": <player status object>, // See Player Status
}

The SELECT_TRACKS command is used to enable or disable media tracks. The tracks are identified by trackID obtained from the TRACKS data object. The media controller device 102A and the media controller device 102B checks the response from the media player 130 to determine if the requested tracks are actually enabled or disabled. In some instances, the media player 130 may be unable to enable a requested track because of local conditions, for example if the media player 130 does not support more than one audio stream at a time.

Modifying selected tracks may trigger a STATUS event notification to all media controller devices, such as the media controller device 102A and the media controller device 102B.

Player Status Events: The data of this event contains a play status event structure with the following data fields:

Event:
{
  "cmd_id": 0,
  "type": "STATUS",
  "status": <player status object>, // See Player Status
}

The media player 130 may send out a STATUS message whenever there is a state transition in the media player 130. In addition the media player 130 may send out periodic updates to synchronize states with second screen applications.

Media time may be extrapolated by the media controller device 102A from the last STATUS update based on a local clock. If the current_time reported by a STATUS message does not match what is locally extrapolated, the local media time is updated to the value in the STATUS message.

Media players, such as the media player 130 shown in FIG. 1, may locally compare the media time reported by the AV system with a local system clock. If the local time drifts too far from the reported media time, a new STATUS event can be generated.

Player Key Request Events: To implement a license delegation protocol, the system may forward key requests coming from the CDM to the media controller device 102A to get a valid token. The token is returned to the media controller device 102A and may be passed when the license is requested. In alternative implementations, the system may return the license directly.

Figure 8:
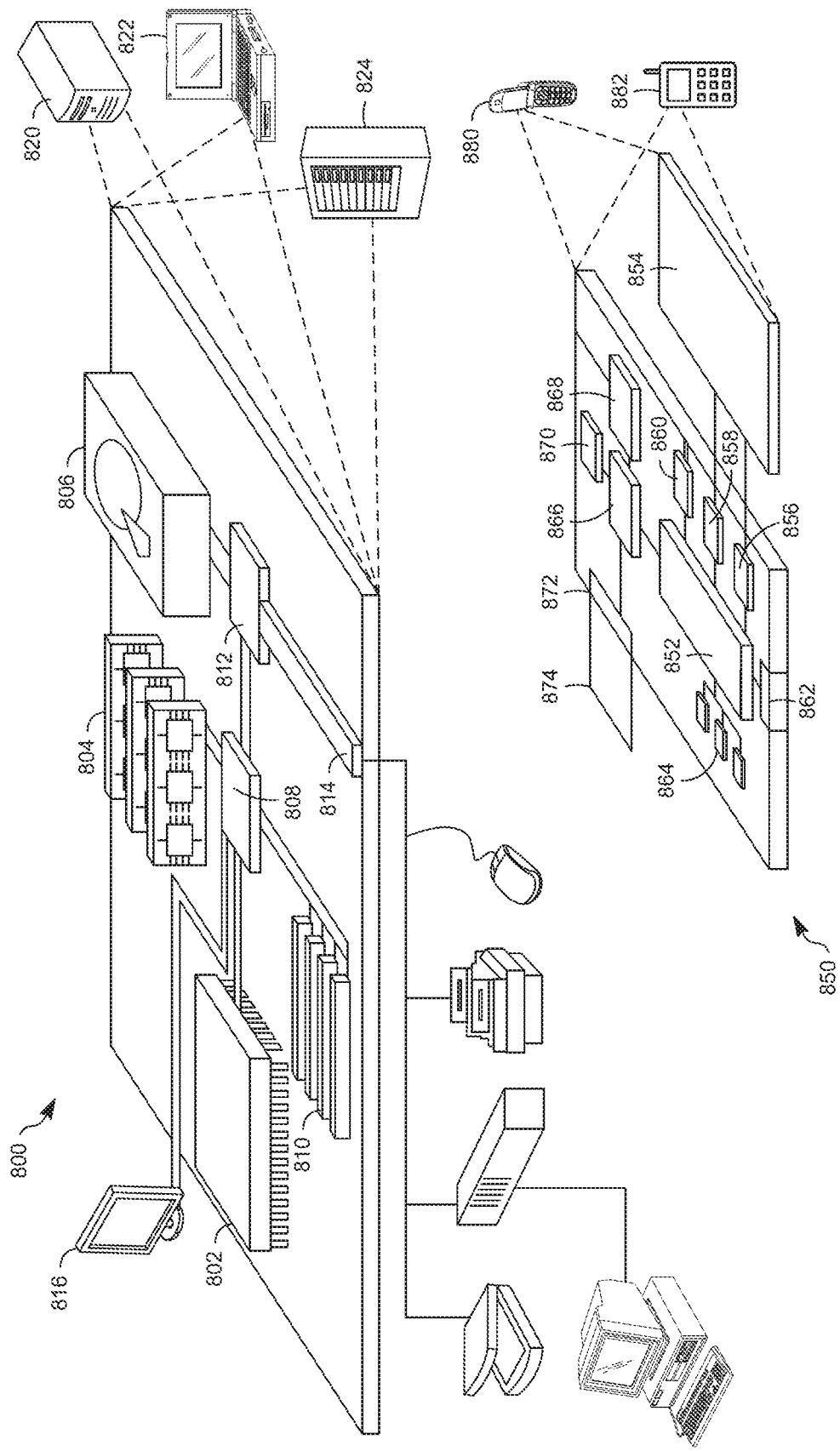
FIG. 8 illustrates an example of a computing device and a mobile computing device that can be used to implement the techniques described here.

FIG. 8 illustrates an example of a computing device and a mobile computing device that can be used to implement the techniques described here. Computing device 800 is intended to represent various forms of digital computers, such as laptops, desktops, workstations, personal digital assistants, servers, blade servers, mainframes, and other appropriate computers, which may be used, in some implementations described here, as media players such as the media player 130 shown in FIG. 1, for example. Computing device 850 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. In some implementations, the memory includes a combination of volatile and non-volatile memory units, for example as described above with respect to FIG. 3. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is illustrative only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion bus 814. The low-speed expansion bus, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, which may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a BLUETOOTH, WIFI, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it may be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated from the described flows, and other components may be added to, or removed from, the described systems. Accordingly, other embodiments are within the scope of the following claims.

What is claimed is:

1. A method for providing remote media control, the method comprising:
   receiving, at a cast receiver included in a media player device from a first cast controller included in a first device, instructions to process a content item at the cast receiver, the content item being initiated by the first device including the first cast controller;
   receiving, at the cast receiver included in the media player device, a command message from a second cast controller included in a second device, a command message to adjust a volume of the content item, wherein the cast receiver is configured to receive command messages from the first cast controller and the second cast controller;
   changing the volume of the content item by the cast receiver included in the media player device upon receiving the command message from the second cast controller; and
   sending, from the cast receiver included in the media player device, a state notification to the first cast controller and the second cast controller upon changing the volume of the content item by the cast receiver, wherein: the state notification is information related to the content item that includes a volume status of the content item; and the state notification triggers the first cast controller and the second cast controller to update volume information presented.

2. The method of claim 1, further comprising changing a playback position of the content item.

3. The method of claim 1, further comprising pausing playback of the content item.

4. The method of claim 1, wherein the content item is initiated via a first instance of a user interface presented on the first device, and wherein the command message is received via a second instance of the user interface presented on the second device.

5. The method of claim 1, further comprising sending second state notifications to the first cast controller and the second cast controller upon determining that a predetermined duration of time has elapsed since the state notification was sent to the first cast controller and the second cast controller.

6. A system for providing remote media control, the system comprising:
   a cast receiver included in a media player device that:
   receives, from a first cast controller included in a first device, instructions to process a content item at the cast receiver, the content item being initiated by the first device including the first cast controller;
   receives a command message to adjust a volume of the content item from a second cast controller included in a second device, wherein the cast receiver is configured to receive command messages from the first cast controller and the second cast controller;
   changes the volume of the content item by the cast receiver upon receiving the command message from the second cast controller; and
   sends a state notification to the first cast controller and the second cast controller upon changing the volume of the content item by the cast receiver, wherein: the state notification includes a volume status; and
   the state notification triggers the first cast controller, the second cast controller, or both to update information presented.

7. The system of claim 6, wherein the cast receiver further changes a playback position of the content item.

8. The system of claim 6, wherein the cast receiver further pauses playback of the content item.

9. The system of claim 6, wherein the content item is initiated via a first instance of a user interface presented on the first device, and wherein the command message is received via a second instance of the user interface presented on the second device.

10. The system of claim 6, wherein the cast receiver further sends second state notifications to the first cast controller and the second cast controller upon determining that a predetermined duration of time has elapsed since the state notification was sent to the first cast controller and the second cast controller.

11. A non-transitory computer-readable medium containing computer executable instructions that, when executed by a processor, cause the processor to perform a method for providing remote media control, the method comprising:
   receiving, at a cast receiver included in a media player device from a first cast controller included in a first device, instructions to process a content item at the cast receiver, the content item being initiated by the first device including the first cast controller;
   receiving a command message to adjust a volume of the content item from a second cast controller included in a second device, wherein the cast receiver is configured to receive command messages from the first cast controller and the second cast controller;
   changing the volume of the content item by the cast receiver upon receiving the command message from the second cast controller; and
   sending a state notification to the first cast controller, the second cast controller, or both upon changing the volume of the content item by the cast receiver, wherein: the state notification includes a volume status; and
   the state notification triggers the first cast controller, the second cast controller, or both to update information presented.

12. The non-transitory computer-readable medium of claim 11, wherein
   the method further comprises changing a playback position of the content item.

13. The non-transitory computer-readable medium of claim 11, wherein
   the method further comprises pausing playback of the content item.

14. The non-transitory computer-readable medium of claim 11, wherein the content item is initiated via a first instance of a user interface presented on the first device, and wherein the command message is received via a second instance of the user interface presented on the second device.

15. The non-transitory computer-readable medium of claim 11, wherein the method further comprises sending second state notifications to the first cast controller and the second cast controller upon determining that a predetermined duration of time has elapsed since the state notification was sent to the first cast controller and the second cast controller.

* * * * *